United States Patent
Baird et al.

(10) Patent No.: US 7,978,831 B2
(45) Date of Patent: Jul. 12, 2011

(54) METHODS AND APPARATUS FOR DEFENDING AGAINST TELEPHONE-BASED ROBOTIC ATTACKS USING RANDOM PERSONAL CODES

(75) Inventors: Henry Baird, Bethlehem, PA (US); Jon Bentley, New Providence, NJ (US); Daniel Lopresti, Hellertown, PA (US); Sui-Yu Wang, Bethlehem, PA (US)

(73) Assignee: Avaya Inc., Basking Ridge, NJ (US)

( * ) Notice: Subject to any disclaimer, the term of this patent is extended or adjusted under 35 U.S.C. 154(b) by 990 days.

(21) Appl. No.: 11/770,938

(22) Filed: Jun. 29, 2007

(65) Prior Publication Data

US 2009/0003539 A1   Jan. 1, 2009

(51) Int. Cl.
*H04M 1/64* (2006.01)
*H04M 11/00* (2006.01)

(52) U.S. Cl. .................................. 379/88.25; 379/91.01
(58) Field of Classification Search ............... 379/88.04, 379/91.01, 88.01
See application file for complete search history.

(56) References Cited

U.S. PATENT DOCUMENTS

| | | | |
|---|---|---|---|
| 7,003,079 B1 | 2/2006 | McCarthy et al. | |
| 7,003,083 B2 | 2/2006 | Kovales et al. | |
| 7,062,437 B2 | 6/2006 | Kovales et al. | |
| 7,065,188 B1 | 6/2006 | Mei et al. | |
| 7,143,039 B1 | 11/2006 | Stifelman et al. | |
| 7,356,130 B2* | 4/2008 | Agapi et al. | 379/77 |
| 7,436,939 B1 | 10/2008 | Packingham et al. | |
| 7,457,395 B2 | 11/2008 | Creamer et al. | |
| 7,606,718 B2* | 10/2009 | Cloran | 705/1.1 |
| 7,653,188 B2 | 1/2010 | Kloberdans et al. | |
| 7,773,731 B2 | 8/2010 | Malik et al. | |
| 7,805,310 B2 | 9/2010 | Rohwer | |
| 2001/0014146 A1 | 8/2001 | Beyda et al. | |
| 2002/0154749 A1* | 10/2002 | Conn et al. | 379/91.01 |
| 2003/0161449 A1 | 8/2003 | Plan | |
| 2004/0107108 A1 | 6/2004 | Rohwer | |
| 2004/0128353 A1 | 7/2004 | Goodman et al. | |
| 2004/0240635 A1 | 12/2004 | Bushey et al. | |
| 2005/0169440 A1* | 8/2005 | Agapi et al. | 379/88.01 |
| 2005/0246775 A1* | 11/2005 | Chellapilla et al. | 726/22 |
| 2006/0122834 A1 | 6/2006 | Bennett | |
| 2006/0165102 A1 | 7/2006 | Franz et al. | |

(Continued)

OTHER PUBLICATIONS

Islam, Mohammad K., "U.S. Appl. No. 11/770,944 Office Action Dec. 27, 2010", , Publisher: USPTO, Published in: US.

(Continued)

*Primary Examiner* — Fan Tsang
*Assistant Examiner* — Mohammad Islam
(74) *Attorney, Agent, or Firm* — Joseph B. Ryan; Jason Paul DeMont; Wayne S. Breyer

(57) ABSTRACT

Methods and apparatus are provided for defending against telephone-based robotic attacks. An interactive voice response method is disclosed, comprising the steps of obtaining a script to present to a caller, the script including at least one menu option having at least one personal code; generating a random number for the personal code; and presenting the at least one menu option with the generated random number to the caller. The step of generating a random number for the personal code is optionally responsive to receipt of the call. The method is optionally performed only if one or more predefined criteria defining an attack are satisfied. The disclosed IVR system can optionally monitor the caller response to determine whether the caller enters the generated random number.

14 Claims, 6 Drawing Sheets

U.S. PATENT DOCUMENTS

| | | | | |
|---|---|---|---|---|
| 2006/0282864 | A1* | 12/2006 | Gupte | 725/89 |
| 2007/0036314 | A1 | 2/2007 | Kloberdans et al. | |
| 2007/0116200 | A1* | 5/2007 | Hewitt et al. | 379/88.01 |
| 2007/0133759 | A1 | 6/2007 | Malik et al. | |
| 2007/0280456 | A1 | 12/2007 | Vadlakonda et al. | |
| 2008/0040754 | A1* | 2/2008 | Lai | 725/64 |
| 2008/0044048 | A1 | 2/2008 | Pentland | |
| 2010/0158219 | A1 | 6/2010 | Dhawan et al. | |
| 2010/0183126 | A1* | 7/2010 | Chambers et al. | 379/88.04 |
| 2010/0241564 | A1* | 9/2010 | Miller et al. | 705/43 |

OTHER PUBLICATIONS

Islam, Mohammad K., "U.S. Appl. No. 11/770,935 Office Action Jan. 6, 2011", , Publisher: USPTO, Published in: US.

Islam, Mohammad K., "U.S. Appl. No. 11/770,935 Notice of Allowance Mar. 18, 2011", , Publisher: USPTO, Published in: US.

Islam, Mohammad K., "U.S. Appl. No. 11/770,935 Examiner's Amendment Mar. 31, 2011", , Publisher: USPTO, Published in: US.

Islam, Mohammad K., "U.S. Appl. No. 11/770,944 Notice of Allowance Apr. 15, 2011", , Publisher: USPTO, Published in: US.

* cited by examiner

310 {
```
START:
WELCOME TO FICTITIOUS AIRLINES
1  PRESS 1 TO TRACK A CURRENT FLIGHT. [TRACK]
2  PRESS 2 TO MAKE A DOMESTIC RESERVATION. [DOMESTIC]
3  PRESS 3 TO MAKE AN INTERNATIONAL RESERVATION. [INTERNATIONAL]
4. PRESS 4 FOR ALL OTHER REQUESTS [OTHER]
5. TO HEAR THESE OPTIONS AGAIN, PRESS 5 [START]
```

320 {
```
TRACK:
WELCOME TO FICTITIOUS AIRLINES FLIGHT TRACKER.
1. IF YOU KNOW THE NUMBER OF THE FLIGHT YOU WANT TO TRACK, PRESS 1
   NOW. [TRACK_NUMBER]
2. IF YOU KNOW THE CITY FROM WHICH THE FLIGHT DEPARTED, PRESS 2 NOW.
   [TRACK_DEPARTURE]
```

RANDOM PERSONAL CODE LIBRARY – 500

"TO LEAVE A MESSAGE FOR DAN, PRESS 3 NOW."
"PRESS 97 FOR ENGLISH, DRÜCKEN SIE 35 FÜR DEUTSCH ..."
"TO CONFIRM YOUR VOTE FOR FANTASIA, PRESS 49 NOW."
"TO PROCEED TO THE POLL, PRESS 438."
"AT THE TONE, PLEASE TYPE YOUR PERSONAL ENTRANCE CODE, WHICH IS 8259; ONCE AGAIN, TYPE 8259 AT THE TONE [BEEP]."

METHODS AND APPARATUS FOR DEFENDING AGAINST TELEPHONE-BASED ROBOTIC ATTACKS USING RANDOM PERSONAL CODES

CROSS-REFERENCE TO RELATED APPLICATIONS

The present invention relates to U.S. patent application Ser. No. 11/770,944, entitled, "Methods and Apparatus for Defending Against Telephone-Based Robotic Attacks Using Permutation of an IVR Menu," and U.S. patent application Ser. No. 11/770,935, entitled, "Methods and Apparatus for Defending Against Telephone-Based Robotic Attacks Using Contextual-Based Degradation," each filed contemporaneously herewith and incorporated by reference herein.

FIELD OF THE INVENTION

The present invention relates generally to interactive voice response techniques, and more particularly, to implicit techniques for defending against robotic attacks in an interactive voice response system.

BACKGROUND OF THE INVENTION

Interactive voice response (IVR) systems allow a computer to detect and process the speech or touch tones entered by a caller. The IVR system can respond with pre-recorded or dynamically generated messages to further direct the caller. IVR systems are often employed when the caller interface can be presented as a number of menu choices. The collection of menu choices associated with an IVR system is often referred to as an IVR tree.

In practice, a caller typically calls a desired telephone number that is answered by an IVR system. The IVR system plays a message and prompts the caller to select an option from a menu of options. The caller can typically press a number associated with a desired menu option on a telephone keypad or state the selected number. For example, the pre-recorded message may prompt the user to "say or press 1 for yes, or say or press 2 for no." Speech recognition is typically employed to interpret the caller's spoken answers in response to the voice prompt.

In such an IVR environment, mechanical agents (or "robots") often attempt to place undesired telephone calls to the IVR system. The robots typically aim to traverse the IVR menu to reach a human agent (and thereby waste a valuable resource), or to reach another limited resources, such as a bank account or other stored data. In an IVR or another telephony domain, spam (i.e., unsolicited or undesired bulk electronic messages) is often referred to as "Spam over Internet Telephony" ("SPIT") and is a problem for both traditional and Voice Over Internet Protocol (VoIP) telephony services. The undesired telephone calls can include, for example, advertising or political messages, interruptions (sometimes referred to as "ring and run"), or denial of service (DoS) attacks. Denial of Service attacks, for example, can overload voice servers and affect system reliability. Robot attacks against telephones could be directed at IVR systems or against humans in teal time or via voice mail or facsimile. In addition, robot attacks can be directed at other limited resources, such as bank accounts or other stored data.

A number of techniques exist for distinguishing between human and computer users, often referred to as "Completely Automated Public Test to tell Computers and Humans Apart," or "CAPTCHA." CAPTCHAs are commonly used on web sites such as those selling event tickets or offering flee e-mail services. An image file that contains a degraded picture of a word is typically displayed, and the user must type in the characters in the image. Such images are generally tuned to be beyond the capability of mechanical optical character recognition (OCR) systems, but within the capability of most human users.

In the telephone domain, Telephone CAPTCHAs (or TCAPTCHAs) have been used to present a user with an audio message (typically a sequence of digits) that has been degraded beyond the capability of speech recognition systems. The caller must enter (or speak) the digit sequence to establish that he or she is a human user. Generally, robots do not have sufficient speech recognition capabilities and will thus fail the tests. In this manner, robots will waste time in an IVR system (and thereby be discouraged from attacking the protected system), while human users will navigate them easily to their desired tasks. The degradation is accomplished, for example, by techniques that add background noise, such as white noise; or other degradations, such as echoes or the simulation of packet loss. The resulting sounds are difficult for machines to recognize, yet are typically easily recognized by human users. The resulting sounds, however, are typically unnatural and potentially irritating to human users. These tests are typically applied at a portal before a user is given access to a system.

A need therefore exists for improved techniques for defending against telephone-based robotic attacks

SUMMARY OF THE INVENTION

Generally, methods and apparatus are provided for defending against telephone-based robotic attacks. According to one aspect of the invention, an interactive voice response method is disclosed, comprising the steps of obtaining a script to present to a caller, the script including at least one menu option having at least one personal code; generating a random number for the personal code; and presenting the at least one menu option with the generated random number to the caller The step of generating a random number for the personal code is optionally responsive to receipt of the call. The method is optionally performed only if one or more predefined criteria defining an attack are satisfied.

According to a further aspect of the invention, the disclosed IVR system can monitor the caller response to determine whether the caller enters the generated random number. Among other benefits, a correct entry of the generated random number provides a confirmation that the caller is a human caller. In one variation, a security level provided by the disclosed method can optionally be evaluated.

A more complete understanding of the present invention, as well as further features and advantages of the present invention, will be obtained by reference to the following detailed description and drawings.

BRIEF DESCRIPTION OF THE DRAWINGS

FIG. 3 illustrates an exemplary representation of a conventional IVR tree;

DETAILED DESCRIPTION

The present invention provides methods and apparatus for defending against telephone-based robotic attacks using random personal codes. The random personal codes provide an implicit CAPTCHA test, that will be transparent to many users. As discussed hereinafter, the random personal codes can be placed at the beginning, end or middle (navigation codes) of an IVR tree, or in several places in a tree. In one embodiment discussed below, the random personal codes have an appropriate number of random digits to provide the desired degree of security.

For example, an IVR message in accordance with the present invention may instruct a caller that desires to leave a message for a particular person (Dan in this example) with the following greeting: "To leave a message for Dan, press {random number} now." The IVR system would state the generated random numbed, and if properly entered by the caller, the caller would be transferred to the voice mail system of Dan. Likewise, an IVR message incorporating random personal codes can be expressed as follows: "Press {random number 1} for English. Drücken Sie {random number 2} für Deutsch . . . . " The IVR system would state the generated random numbers, and if the random number associated with English for this call is properly entered by the caller, the IVR system would thereafter branch to the English sub-tree of the IVR tree, or if the random number associated with German for this call is properly entered by the caller, the IVR system would thereafter branch to the German sub-tree of the IVR tree In another variation, the random personal codes of the present invention can be employed to increase the security of a telephone based voting system. For example, if a television show provides a voting system that allows a caller to register a vote for a designated person, such as Fantasia, by calling a designated number, the caller can be provided with the following greeting that incorporates the present invention: "To confirm your vote for Fantasia, press {random number} now." The IVR system would state the generated random number as part of the greeting, and if the random number associated with Fantasia for this call is properly entered by the caller, the vote for Fantasia would be validly accepted by the system. In this manner, there is a higher level of confidence that the vote is being placed by a human caller.

Figure 1:
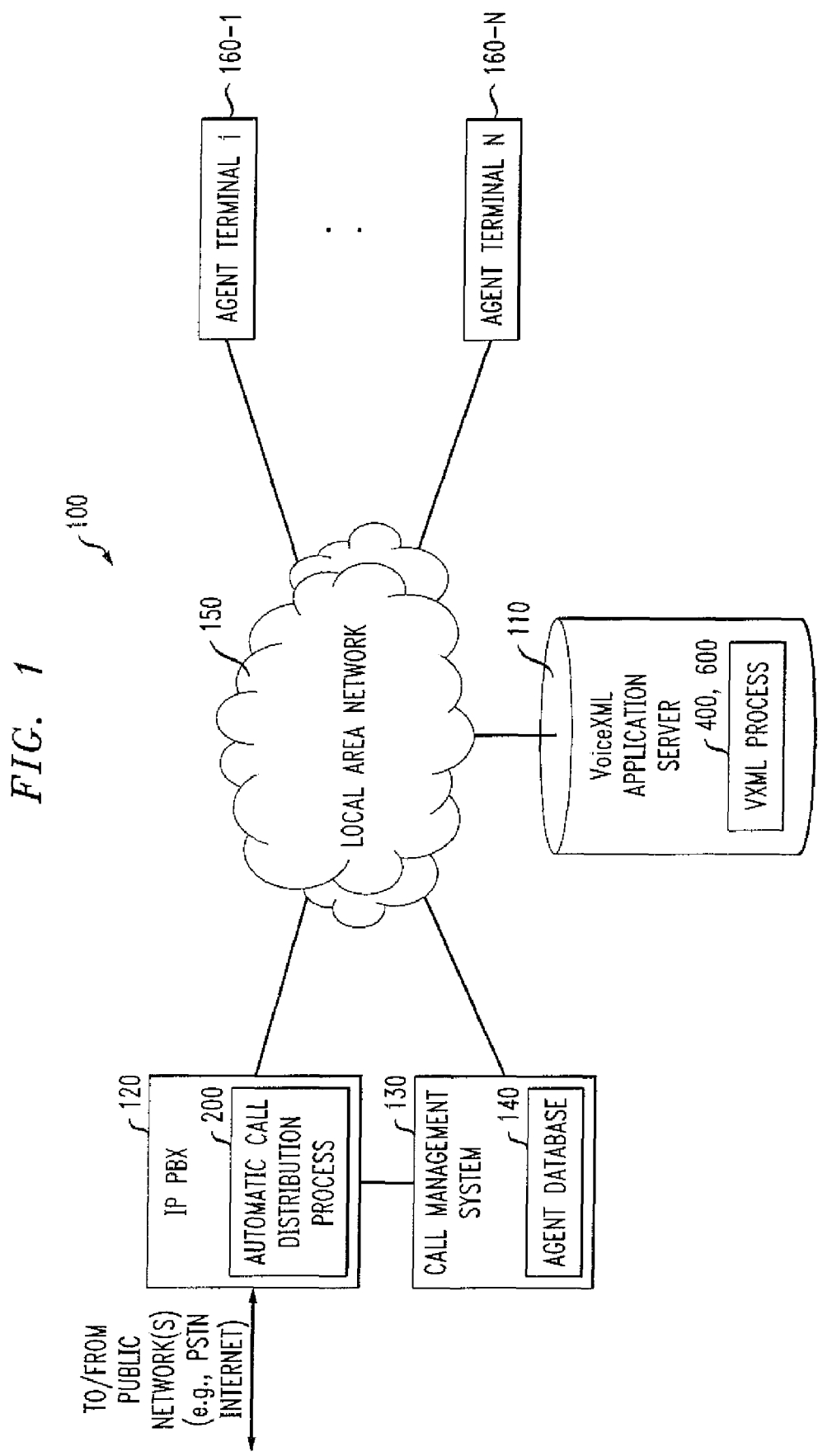
FIG. 1 illustrates an exemplary IVR system in which the present invention can operate.

FIG. 1 illustrates an exemplary IVR system 100 in which the present invention can operate. As used herein, an IVR system comprises any device capable of providing a message to a user and to process the entered or spoken response of the caller. For example, an IVR system can include a voice mail system, a voice mail system behind a Private Branch Exchange (PBX) switch, or a personal answering machine. As shown in FIG. 1, the IVR system 100 includes a voiceXML application server 110, an Internet Protocol (IP) private branch exchange (PBX) 120, a call management system 130, one or more agent terminals 160-1 through 160-N (hereinafter, collectively referred to as agent terminals 160) and optionally one or more additional limited resources 190, such as a bank account, interconnected by a local area network (LAN) 150.

The IVR application (including the IVR scripts) may be written, for example, in VoiceXML (VXML) and stored on the central VoiceXML application server 110. The VoiceXML application server 110 may be embodied, for example, as a Microsoft Web server with Internet Information Services (IIS) package installed and enabled, commercially available from Microsoft Corp. of Redmond, Wash., as modified herein to carry out the features and functions of the present invention. It is noted, however, that while the exemplary embodiment employs voiceXML, other techniques that provide HTML-based support for IVR, such as Speech Application Language Tags (SALT), described, for example, in Speech Application Language Tags (SALT), Technical White Paper, downloadable from www.saltforum.org, could be employed, as would be apparent to a person of ordinary skill in the art, based on the disclosure herein.

The IP PBX 120 includes an automatic call distribution process 200, discussed below in conjunction with FIG. 2, that manages the IVR resources. Generally, the automatic call distribution process 200 monitors the availability status of all IVR agents in the IVR system 100 using an agent database 140, and distributes telephone calls and other types of communications to the appropriate agents. The IP PBX 120 can provide information to the call management system 130 regarding the availability of individual agents and other call center statistics, for the generation of appropriate reports and forecasts.

The call management system 130 may be embodied, for example, as the Call Management System®, commercially available from Avaya Inc. of Basking Ridge, N.J., as modified herein to carry out the features and functions of the present invention. The IP PBX 120 may be embodied, for example, as the IP 600 Internet Protocol Communications Server, commercially available from Avaya Inc. of Basking Ridge, N.J., as modified herein to carry out the features and functions of the present invention.

The IVR capabilities of a given agent terminal 160 appear to the automatic call distribution process 200 as an agent logged onto an instance of a desktop telephone at the corresponding agent terminal 160. When a call is received at the IVR system 100, the call is routed using well-known techniques to the IVR extension on the agent terminal 160 and a remote IVR process can handle the call. The agent terminals 160 can be embodied as any computing system having a processor and memory configured to perform the disclosed features and functions of the present invention, such as a personal computer, workstation or personal digital assistant.

Figure 2:
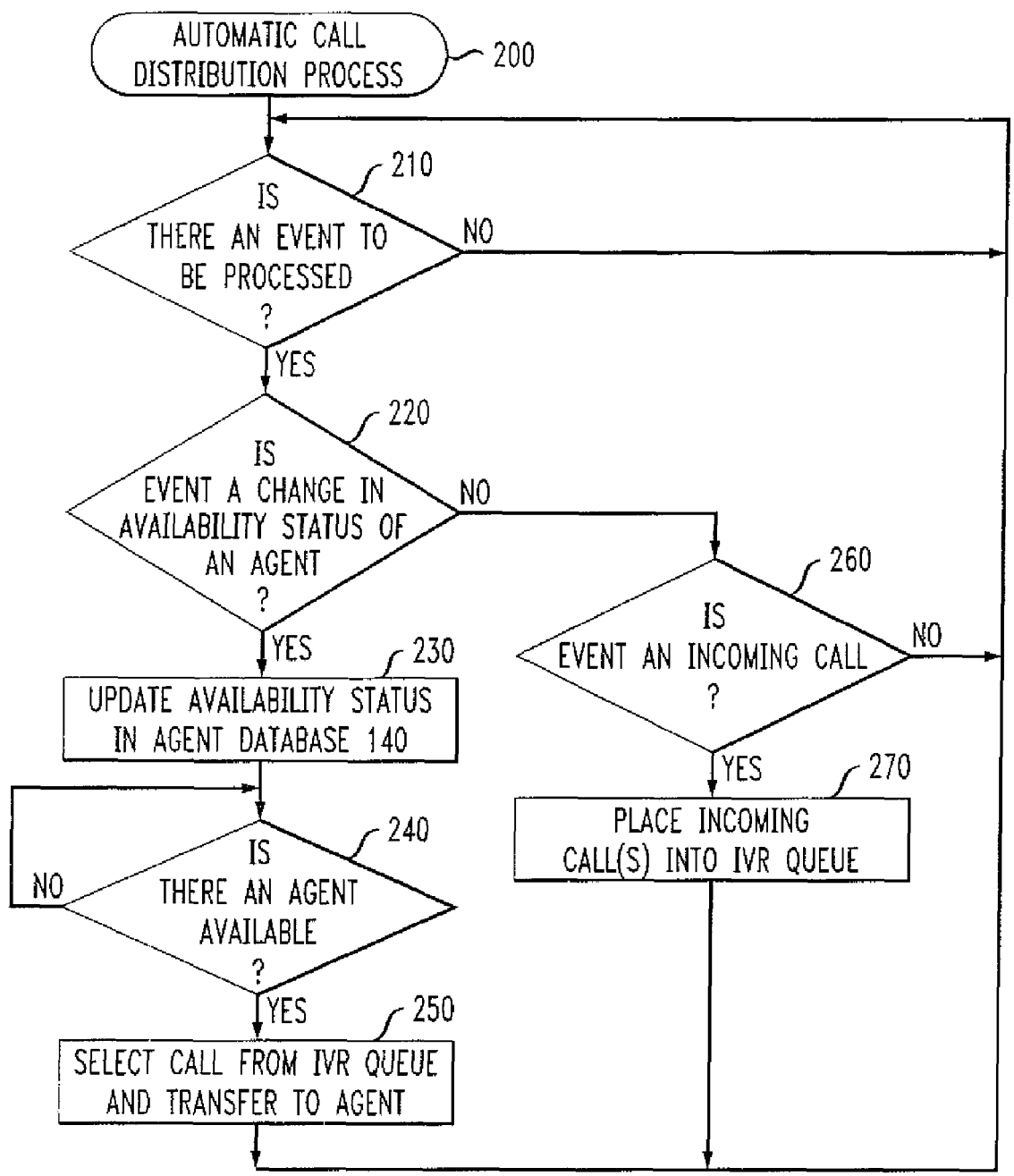
FIG. 2 is a flow chart describing an exemplary implementation of the automatic call distribution process of FIG. 1.

FIG. 2 is a flow chart describing an exemplary implementation of the automatic call distribution process 200. As previously indicated, the automatic call distribution process 200 employs an agent database 140, to record the availability status of each agent in the IVR system 100. For each agent, the agent database 140 includes, for example, the extension address of the agent, an indication of any special skills of the agent, and an indication of the availability of the agent.

The automatic call distribution process 200 manages the IVR resources by monitoring the availability status of the IVR agents 160 and distributing telephone calls and other types of communications to the appropriate agents. The automatic call distribution process 200 places calls into an IVR queue as with conventional centralized server systems. As discussed hereinafter, whenever an IVR agent becomes available, a call is selected from the waiting queue and presented to the agent. A record of each call started and each call completed can be made to the call management system 130 for inclusion in status and historical reports.

As shown in FIG. 2, the automatic call distribution process 200 initially performs a test during step 210 to determine if an event is detected. If it is determined during step 210 that an event is not detected, then program control returns to step 210 until an event to be processed is detected. Once it is determined during step 210 that an event is detected, then program control proceeds to step 220 where a further test is performed during step 220 to determine if event is a change in the availability status of an agent. If it is determined during step 220 that there is no change in the availability status of an agent, then program control proceeds to step 260, discussed below. If, however, it is determined during step 220 that there is a change in the availability status of an agent, then the availability status is updated in the agent database 140 during step 230.

A further test is performed during step 240 to determine if an agent is available. If it is determined during step 240 that an agent is not available, then program control returns to step 240 until an available agent is detected. If, however, it is determined during step 240 that an agent is available, then a call is selected from the IVR queue and transferred to the available agent during step 250.

If it is determined during step 220 that there is no change in the availability status of an agent, then a further test is performed during step 260 to determine if the event is an incoming call. If it is determined during step 260 that the event is not an incoming call, then program control returns to step 210 and continues in the manner described above. If it is determined during step 260 that the event is an incoming call, then all incoming calls are placed into an IVR queue (not shown) during step 270, in a known manner. Program control then terminates or returns to step 210 for continued monitoring of changes in the availability status of agents and distributing telephone calls and other types of communications to the appropriate agents.

FIG. 3 illustrates an exemplary representation of a conventional IVR tree 300. As previously indicated, the exemplary IVR tree 300 may be written as a VXML script or another voice markup language that can be applied to a parser for rendering to a user. An exemplary IVR system 100 might start a call with initial greeting 310 that is played to the caller, such as the following message:

"Welcome to Fictitious Airlines
1. Press 1 to track a current flight. [TRACK]
2. Press 2 to make a domestic reservation. [DOMESTIC]
3. Press 3 to make an international reservation. [INTERNATIONAL]
4. Press 4 fox all other requests. [OTHER]
5. To heat these options again, press 5. [START]
The exemplary IVR system 100 plays the above greeting 310 and prompts the caller to select an option from a menu of five options. The caller can typically press a number associated with a desired menu option (referred to herein as a selection number) on a telephone keypad or state the selected number. It is noted that the leading number for each entry in the above list, such as the string "1" is typically not pronounced by the IVR system 100. It is further noted that the text shown in square brackets for each entry in the above list, such as the string "[TRACK]", indicates a node in the IVR tree to which the IVR system will jump if the caller enters the corresponding selection option. For example, if the caller response is "2," the IVR system 100 will jump to the [TRACK] node of the IVR tree. The node string is typically not pronounced by the IVR system 100.

As shown in FIG. 3, if the caller enters a selection number of 1, for example, in order to track a current flight, the caller will be presented with a corresponding secondary message 320 associated with the selected tracking menu option.

The present invention recognizes that a robot that attacks this system can easily enter a fixed sequence of numbers to eventually reach a human agent and waste the time of the human agent or to access and consume another limited resource. According to various embodiments of the present inventions, the IVR system 100 can employ random personal codes in one or more of the menu options, or apply contextual-based degradations to one or more of the menu options. It is noted that the random personal codes and contextual-based degradations can be used independently of one another, or in an integrated IVR system for added security.

Random Personal Codes

Figure 4:
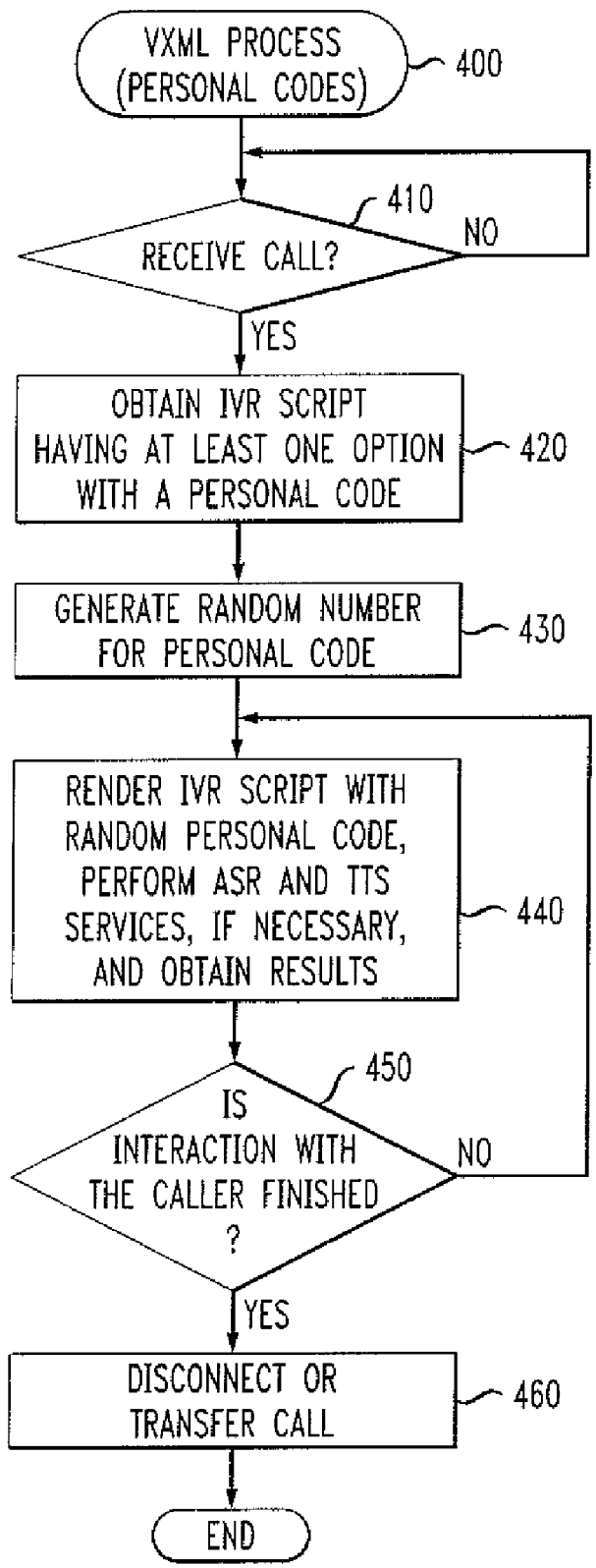
FIG. 4 is a flow chart describing an exemplary implementation of a VXML process for random personal codes incorporating features of the present invention.

FIG. 4 is a flow chart describing an exemplary implementation of a VXML process 400 for a random personal code embodiment of the present invention. It is noted that the VXML process 400 of FIG. 4 can be used to process all received calls or optionally the VXML process 400 can be implemented to only be operational when the IVR system 100 is under attack.

Although the VXML process 400 is illustrated as being performed centrally by the VXML server 110, the VXML process 400 may be implemented in a distributed manner, for example, on the agent terminal 160 associated with a received call, as would be apparent to a person of ordinary skill. In a distributed implementation, when a call is assigned to a given agent terminal 160, the associated VXML process 400 would obtain the appropriate application page from the voiceXML application server 110 and execute the VXML page to play the appropriate prompts from the IVR script to the caller and to collect DTMF or speech recognized inputs from the caller. At the end of a given call, the VXML process 400 will either disconnect the call or request the IP PBX switch 120 to transfer the call to the appropriate call center agent or application.

As shown in FIG. 4, the VXML process 400 is initiated during step 410 upon receipt of a call to the IVR system 100. Upon receipt of a call, the VXML process 400 will obtain the appropriate IVR script during step 420 having at least one option with a random personal code. The VXML process 400 will generate the random number(s) for the personal code during step 430.

The VXML process 400 renders the IVR script with the random personal codes, performs ASR and IIS services, as necessary, and returns results to the VXML applications server 110 during step 440. A test is performed during step 450 to determine if the interaction with the caller is finished. For example, the final VXML page sent from the VXML applications server 110 to the VXML process 400 can instruct the VXML process 400 to terminate or transfer the call. If it is determined during step 450 that the interaction with the caller is not finished, the VXML process 400 will return to step 440 to process the remaining IVR script. If it is determined during step 450 that the interaction with the caller is finished, the VXML process 400 will request disconnection a transfer of the call during step 460.

Figures 5, 6:
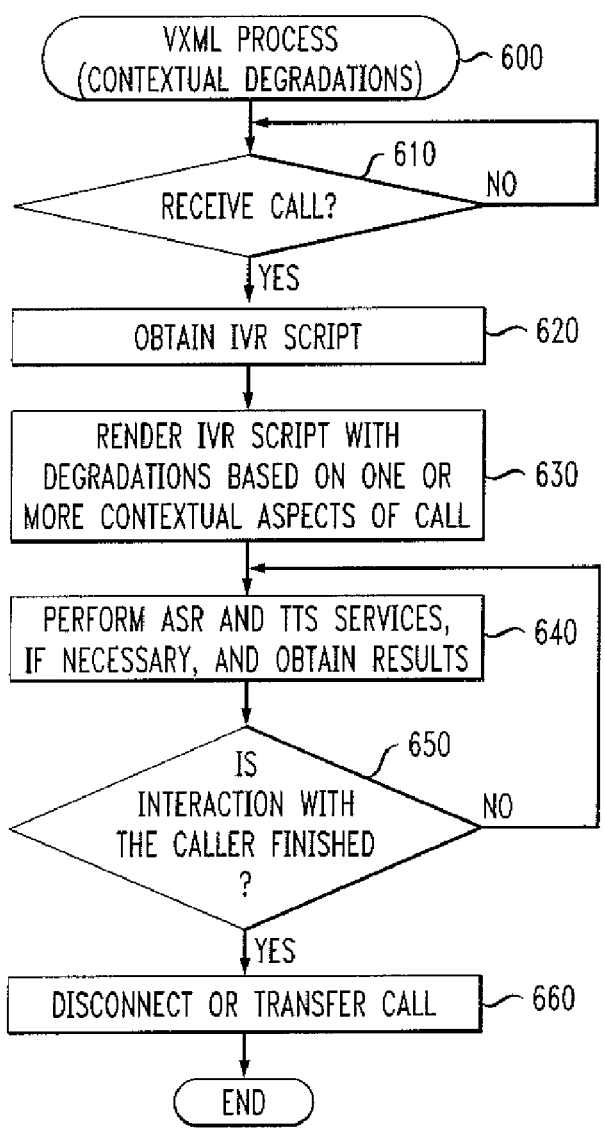
FIG. 5 illustrates a random personal code library that can be employed by the VXML process of FIG. 4.
FIG. 6 is a flow chart describing an exemplary implementation of a VXML process for contextual degradations incorporating features of the present invention.

FIG. 5 illustrates a random personal code library 500 that can be employed by the VXML process of FIG. 4. As indicated above, an IVR message in accordance with the random personal codes of the present invention may instruct a caller that desires to leave a message for a particular person, such as Dan, with the following greeting: "To leave a message for Dan, press {random number} now." The IVR system would state the generated random number, and if properly entered by the caller, the caller would be transferred to the voice mail system of Dan. Likewise, an IVR message incorporating random personal codes can be expressed as follows: "Press {random number 1} for English. Drücken Sie {random number 2} für Deutsch . . ." The IVR system would state the generated random numbers, and if the random number associated with English for this call is properly entered by the caller, the IVR system would thereafter branch to the English sub-tree of the IVR tree, or if the random number associated with German for this call is properly entered by the caller, the IVR system would thereafter branch to the German sub-tree of the IVR tree.

In another variation, the random personal codes of the present invention can be employed to increase the security of a telephone based voting system. For example, if a television show provides a voting system that allows a caller to register a vote for a designated person, such as Fantasia, by calling a designated number, the caller can be provided with the following greeting that incorporates the present invention: "To confirm your vote for Fantasia, press {random number} now." The IVR system would state the generated random number as part of the greeting, and if the random number associated with Fantasia for this call is properly entered by the caller, the vote for Fantasia would be validly accepted by the system. In this manner, there is a higher level of confidence that the vote is being placed by a human caller.

The random personal code library 500 includes a number of additional examples, that have each been populated with the random number generated for a particular call.

Random Code Security

The random personal codes in the above examples represent an integer of a certain number of digits chosen uniformly at random for any particular call. A human can easily navigate such messages, while that is beyond the capability of speech recognition systems. Such implicit tests could be conducted, for example, at entrance to an IVR system 100, or, for instance, before a vote was tallied in an automated polling system. Short numbers (such as those having 1 or 2 digits) may suffice if little assurance is required. If additional security is required, longer numbers might be needed, as discussed below.

The random personal codes discussed above provide a mechanism for making it more difficult for robots to gain access to limited resources, such as customer service representatives or financial accounts In fact, the personal codes can be analyzed and the probability of a certain class of attacker gaining entrance in their presence can be quantified (by considering the mechanism against a member of a certain specified class of attackers).

Initially, consider how a two-digit personal code fires against an attacker that guesses random digits. It is assumed that the personal code consists of two random digits 0-9, and that the attacker also guesses two random digits in that range. The probability of the first digit being correct is $\frac{1}{10}$, and the same is true for the second digit. The probability of getting both digits correct is therefore $\frac{1}{10}*\frac{1}{10}$, or $\frac{1}{100}$. This can also be written (using an exponentiation operator) as $10^{-2}$.

The above analysis can be generalized to any number of digits. A random guesser has the probability of guessing a 1-digit code of $10^{-1}$, a probability of guessing a 2-digit code of $10^{-2}$, and $10^{-3}$ for a 3-digit code, and so forth. For a K-digit code, the probability of success is only $10^{-K}$.

This analysis can be used to tune a system. Suppose that in a certain system, there are 100,000 customers calling in each day. Suppose further that 100,000 nuisance calls are expected from robots, and that each robot is expected to randomly guess digits when facing the disclosed TCAPTCHA. If 4-digit personal codes are employed, then the probability of success of each attack is $10^{-4}$, so the number of attacks expected to leak through is just $10^{-5}*10^{-4}$, for a total of 10 CSRs being bothered by robots. Therefore, reasonable decisions can be made about how long to make the personal codes (longer codes are more irritating to the 100,000 real callers, some of whom will make mistakes in entering them).

The security can also be assessed for more complicated models of attackers. If it is assumed that for each digit there is a specified probability of the attacker guessing it via voice recognition (the probability should be between 0.1 and 1.0). A similar analysis can be conducted to determine how long the code should be. More complex models yet could assume probabilities of the attacker guessing various digits, and so on.

The probability of success can also be analyzed as a function of background signal level, for both human customers and robot attackers. This will help the assignment of the background signal level appropriately.

TCAPTCHAs can also be used to estimate a frequency of attack. TCAPTCHAs can be inserted in "peace time" when the system is known not to be under attack, and gather statistics to observe how often humans fail to recognize such codes. In "war conditions," when TCAPTCHAs are deployed, the system can count how often the TCAPTCHAs are passed and how often they are failed. The peace-time statistics can then be used to estimate how often robots succeed, and how often humans fail.

The present invention recognizes that the random personal codes may be attacked by sophisticated automatic speech recognition (ASR) and may not provide sufficient security for some applications. Thus, another aspect of the invention applies contextual-based degradations to one or more of IVR menu options.

Contextual-Based Degradations

FIG. 6 is a flow chart describing an exemplary implementation of a VXML process 600 for a contextual degradation embodiment of the present invention. It is noted that the VXML process 600 of FIG. 6 can be used to process all received calls or optionally the VXML process 600 can be implemented to only be operational when the IVR system 100 is under attack.

Although the VXML process 600 is illustrated as being performed centrally by the VXML server 110, the VXML process 600 may be implemented in a distributed manner, for example, on the agent terminal 160 associated with a received call, as would be apparent to a person of ordinary skill In a distributed implementation, when a call is assigned to a given agent terminal 160, the associated VXML process 600 would obtain the appropriate application page from the voiceXML application server 110 and execute the VXML page to play the appropriate prompts from the IVR script to the caller and to collect DTMF or speech recognized inputs from the caller. At the end of a given call, the VXML process 600 will either disconnect the call or request the IP PBX switch 120 to transfer the call to the appropriate call center agent or application.

As shown in FIG. 6, the VXML process 600 is initiated during step 610 upon receipt of a call to the IVR system 100. Upon receipt of a call, the VXML process 600 will obtain the appropriate IVR script during step 620. The VXML process 600 will render the IVR script during step 630 with degradations based on one or more contextual aspects of call. For example, in an enterprise setting, the degradation can be based on one or more characteristics of the enterprise, such as an enterprise theme song or business-related sounds.

The VXML process 600 performs ASR and IIS services, as necessary, and returns results to the VXML applications server 110 during step 640. A test is performed during step 650 to determine if the interaction with the caller is finished. For example, the final VXML page sent from the VXML applications server 110 to the VXML process 600 can instruct the VXML process 600 to terminate or transfer the call. If it is determined during step 650 that the interaction with the caller is not finished, the VXML process 600 will return to step 640 to process the remaining IVR script. If it is determined during step 650 that the interaction with the caller is finished, the VXML process 600 will request disconnection a transfer of the call during step 660.

Figure 7:
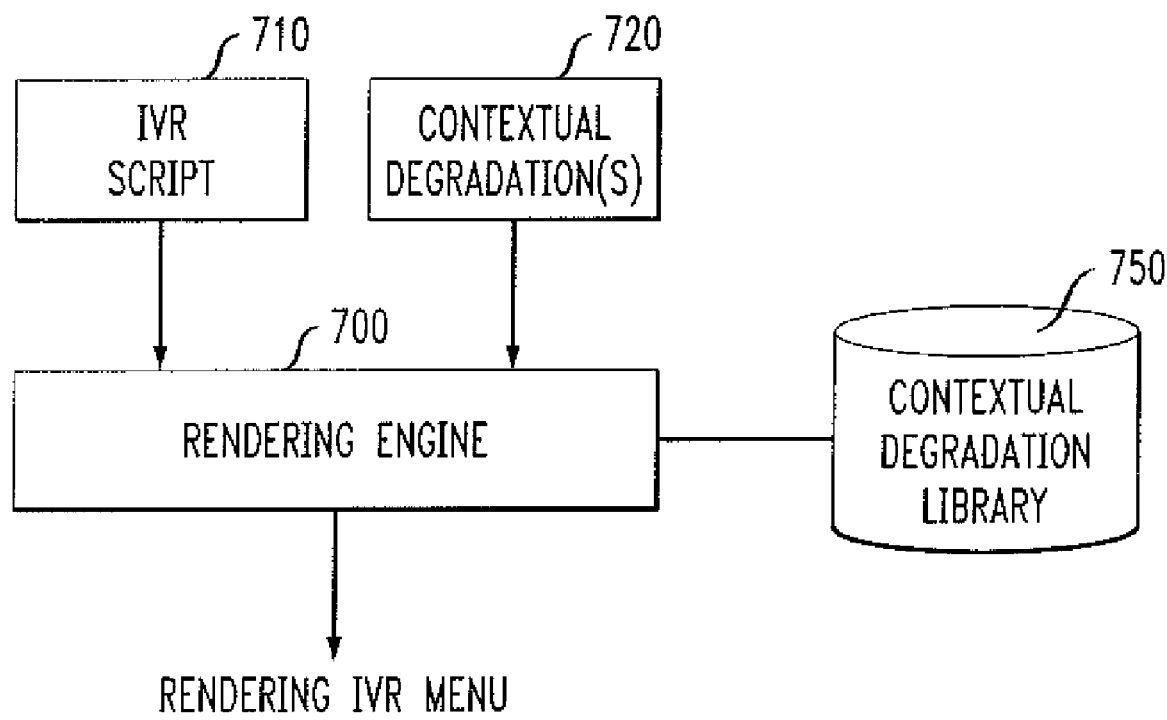
FIG. 7 is a schematic block diagram of a tendering engine that can implement the contextual degradation embodiment of the present invention.

FIG. 7 is a schematic block diagram of a rendering engine 700 that can implement the contextual degradation embodiment of the present invention. As shown in FIG. 7, the rendering engine 700 combines the IVR script 710 (or portions thereof) with one or more contextual degradations 720 to generate the rendered IVR menu. For example, the rendering engine 700 may combine the menu option from the above example "2. Press 2 to make a domestic reservation." with the roar of a jet engine for an exemplary airline enterprise. For a sports franchise, the IVR menu option(s) can be combined with the roar of a crowd or a sportscaster or recorded highlight. In addition, the contextual-based degradations can be based on the date or time associated with the call. For example, seasonal music can be applied for holidays such as July $4^{th}$ and Halloween, or audio files associated with a particular time period.

The present invention recognizes that if there is one fixed contextual degradation 720, then a sophisticated attacker could filter it out. Thus, a further variation optionally employs a library 750 of contextual degradation. In this manner, the rendering engine 700 can randomly select a contextual degradation from a large set. The library 700 might include, for example, a library of speeches for a given political party or sports highlights for a given sports team. In a further variation, the rendering engine 700 can employ MIDI music that allows the contextual degradation to be an appropriate song or musical selection, with variable instrument, pitch, tempo and starting point.

Contextual Degradation Training

The present invention recognizes that humans will do better making selections after learning voices in context. Thus one embodiment of the present invention provides implicit training periods that provide a brief training period that allows humans to learn the contextual background. Such an implicit learning is useful (and natural) to humans, but does not help current ASR systems. The training period should be long enough to familiarize humans with both the signal and noise, but not so long as to be distracting or irritating.

The training period can start, for example, with a low contextual background noise and increase the volume throughout the training period to a loud background at the test. In addition, the training period can switch among related backgrounds, such as a welcome background over a Kennedy speech, then a personal code over a Carter speech, for a Democratic Party IVR system.

While the figures herein show an exemplary sequence of steps, it is also an embodiment of the present invention that the sequence may be varied. Various permutations of the algorithms are contemplated as alternate embodiments of the invention.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:
1. A method comprising:
receiving, at an interactive voice response (IVR) system a call from a caller;
obtaining, by the interactive voice response (IVR) system, a script to present to the caller, the script including a first menu option and a second menu option, wherein the first menu option is associated with a selection number that is randomly generated by the interactive voice response (IVR) system;
and
presenting, by the interactive voice response (IVR) system, the first menu option with the selection number to the caller;
wherein the selection number is a number that needs to be transmitted by the caller back to the interactive voice response (IVR) system in order for the caller to select the first menu option over the second menu option.

2. The method of claim 1 further comprising determining whether the caller enters the randomly generated selection number.

3. The method of claim 2 wherein a correct entry, by the caller, of the randomly generated selection number provides a confirmation that the caller is a human caller.

4. The method of claim 1 wherein the randomly generated selection number is generated in response to a receipt of the call by the interactive voice response (IVR) system.

5. The method of claim 1 wherein the method is performed only if one or more criteria defining an attack are satisfied.

6. The method of claim 1 wherein the interactive voice response (IVR) system is any device capable of:
   (i) Providing a message to the caller, and
   (ii) processing a response to the message by the caller.

7. A method comprising:
   receiving, by an interactive voice response (IVR) system, a call from a caller;
   presenting, by the interactive voice response (IVR) system, the caller with a menu, wherein:
      (i) the menu comprises a first menu option and a second menu option,
      (ii) the first menu option is associated with a first number that is randomly generated by the interactive voice response (IVR) system in response to receiving the call from the caller,
      (iii) the second menu option is associated with a second number that is randomly generated by the interactive voice response (IVR) system in response to receiving the call from the caller, and
      (iv) the second number is different from the first number;
   receiving, by the interactive voice response (IVR) system, a third number from the caller;
   when the third number is the same as the first number, determining, by the interactive voice response (IVR) system, that the caller selected the first menu option from the menu, and
   when the third number is the same as the second number, determining, by the interactive voice response (IVR) system, that the caller selected the second menu option from the menu.

8. The method of claim 7 wherein:
   the first number is a number that has to be transmitted by the caller back to the interactive voice response (IVR) system in order for the caller to select the first menu option over the second menu option, and
   the second number is a number that has to be transmitted by the caller back to the interactive voice response (IVR) system in order for the caller to select the second menu option over the first menu option.

9. The method of claim 7 wherein the interactive voice response (IVR) system is any device capable of:
   (i) providing a message to the caller and
   (ii) processing a response to the message by the caller.

10. The method of claim 7 wherein:
    (a) the menu is part of an interactive voice response (IVR) tree,
    (b) selection of the first option by the user causes the interactive voice response (IVR) system to execute a first branch of the tree, and
    (c) selection of the second option by the caller causes the interactive voice response (IVR) system to execute a second branch of the tree.

11. The method of claim 10 wherein the interactive voice response (IVR) system comprises a processor.

12. The method of claim 7 wherein the interactive voice response (IVR) system uses the first number and the second number to confirm that the caller is a human caller.

13. A system comprising a processor operative to:
    (i) generate a random number,
    (ii) insert the random number, into a menu from a script, as a selection number corresponding to an option from a plurality of options in the menu, and
    (iii) use the random number to identify a selection, by a caller, of the option;
    wherein the selection number is a number the caller has to transmit back to the system in order to select the option over other options from the plurality.

14. The call processing system of claim 13 wherein the random number is generated in response to receiving a call from the caller.

* * * * *